Aug. 1, 1944.  C. H. BENSINGER  2,354,735
TOOL
Filed March 22, 1943
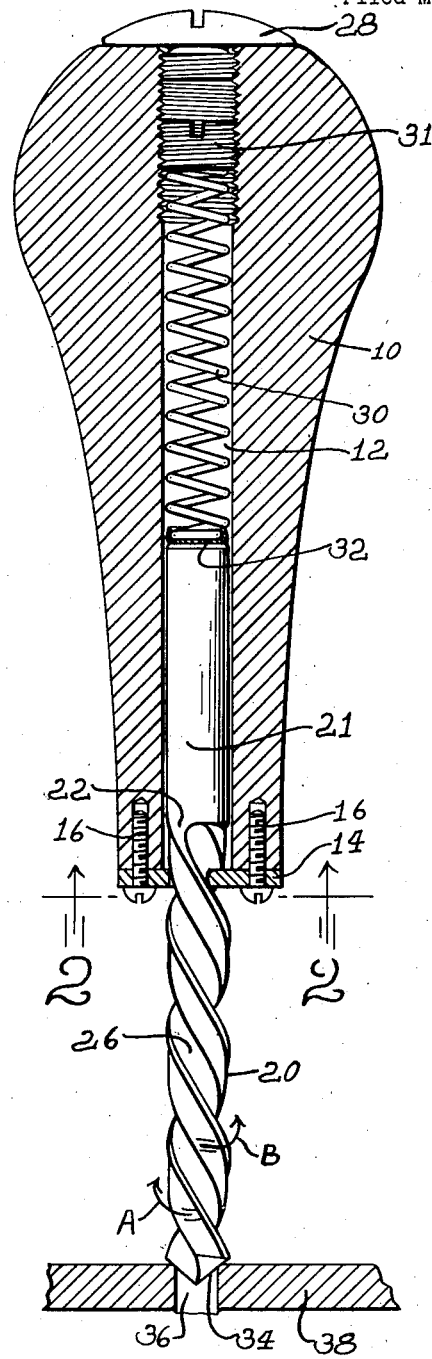
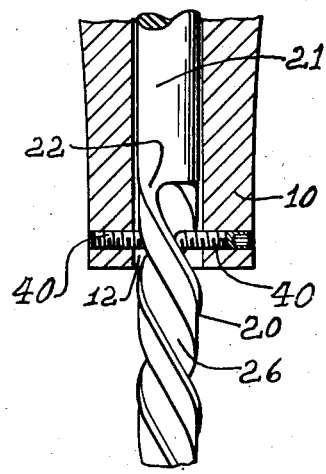
INVENTOR
CHARLES H. BENSINGER
BY
Harness, Dind, Patee & Harris
ATTORNEYS Patented Aug. 1, 1944

2,354,735

UNITED STATES PATENT OFFICE 2,354,735

TOOL

Charles H. Bensinger, Dearborn, Mich.

Application March 22, 1943, Serial No. 480,032

2 Claims. (Cl. 77—73.5)

This invention relates to a tool and more particularly to a tool for chamfering the edges of a drilled opening. The invention is illustrated as embodied in a hand tool but it is equally applicable to a machine for automatic operation.

An object of the invention is to provide a tool holder adapted to receive a fluted twist drill with means carried by the holder for engagement with the flutes of the drill whereby relative longitudinal movement of the holder and drill will cause rotation of the drill relative to the holder.

Another object of the invention is to rotate the drill, relative to the holder, in a non-cutting direction by a movement of the holder relative to the drill in a direction toward the work whereby the drill is retracted into the body of the holder; to provide resilient spring means which is compressed by such movement to create a longitudinal pressure on the drill urging the cutting edge thereof toward the work; to utilize that spring pressure to extract the drill partially from the holder when the holder is moved in a direction from the work; and to arrange the cutting edge of the drill in such a manner that the cutting operation is performed during its rotation in an opposite direction caused by the relative longitudinal movement of the holder and drill while the holder is being moved in a direction away from the work.

A further object of the invention is to provide an improved method of chamfering the edge of an opening which consists in applying maximum pressure of the cutting edge on the work at the beginning of the cutting operation and progressively decreasing that pressure during the cutting operation.

Other objects and advantages of the invention will more fully appear from the following description taken in connection with the accompanying drawing in which:

Fig. 1 is a longitudinal sectional view of the tool showing the drill in side elevation and placed in an opening of a sheet metal plate shown in section;

Fig. 2 is a sectional view taken on line 2—2 of Fig. 1 showing a means for rotating the drill relative to the holder; and Fig. 3 is fragmentary sectional view corresponding to the holder and drill shown in Fig. 1 but showing a modified form of the rotating means for the drill.

Referring to the drawing I have shown a tool having a holder 10 provided with an opening 12 extending longitudinally therethrough. One end of the holder is provided with a plate 14 which may be detachably secured to the end of the holder 10 by screws 16. The plate 14 has an irregularly shaped opening 18 therethrough to receive the fluted portion 20 of a twist drill 22. The opening 18 has inwardly extending tongues 24 which extend into the spiral grooves 26 of the fluted portion 20.

The shank 21 of the drill 22 is received in the opening 12 and is adapted to freely reciprocate therein. Upon relative axial movement of the drill 22 with respect to the holder 10, the tongues 24, in frictional engagement with the side walls of the spiral grooves 26, cause a turning of the drill 22.

The opposite end of the holder 10 is provided with a plug 28 which is screw-threaded into the opening 12. A compression spring 30 is arranged in the opening 12 and has its opposite ends abutting a longitudinally adjustable plug 31 and end of the drill 22. A cap 32 is arranged on the one end of the spring 30 to provide a frictional contact means between the relative turning movement of the spring 30 and drill 22. The spring 30 is slightly compressed and serves to retain the drill in its extracted position as shown in Fig. 1. The adjustable plug 31 provides a means for adjusting the amount of tension on the spring 30.

The drill 22 is shown as a left-handed drill with its cutting edge shown at 34, but a right-handed drill may be used if the cutting edge is the reverse of that of standard practice.

When the drill is placed on the edge of an opening 36, smaller than the diameter of the drill, and a pressure is applied to the holder 10 the drill 22 is rotated in a direction indicated by the arrow A compressing the spring 30. Since the cutting edge 34 of the drill is on the trailing side of the fluted end, there is no cutting operation performed on the edge of the opening 36 in the work 38. When the downward pressure on the holder 10 is relieved and is held from turning, the spring 30 causes relative axial movement of the drill 22 and holder 10, and such axial movement causes turning of the drill 22 in a direction indicated by the arrow B. The cutting edge 34 is now the leading edge, and the cutting operation is started under maximum pressure. As the drill 22 is further extracted from the holder 10, the spring pressure is progressively decreased during the cutting operation until the drill 22 reaches its stop position determined by the end of the grooves 26 striking the tongues 24.

Heretofore the cutting operation has been done during the downward movement of the holder under a progressively increasing pressure. This results in a burr on the surface of the work when the drill stops rotating at its maximum pressure. It will be understood that by my improved method of cutting under decreasing pressure the chip becomes thinner at the end of the cutting operation and the surface is, in effect, polished rather than cut at the end of the operation. The maximum cutting is at the beginning of the operation. This improved method is the reverse of standard practice and results in smooth, clean surfaces without grooves or burrs.

Referring to Fig. 3, I have shown a modified means for causing relative turning movement of the holder 10 and drill 22 during the relative axial movement thereof. In this form, screw-threaded pins 40 are received in the end of the holder 10 which may be adjusted radially of the opening 12 to engage the grooves 26 of the drill 22.

It will be understood that various changes, including the size, shape, and arrangement of parts, may be made without departing from the spirit of my invention and it is not my intention to limit its scope other than by the terms of the appended claims.

I claim:

1. A tool adapted for chamfering the edge of an opening including a drill having a shank at one end portion thereof and a plurality of spiral flutes extending from the other end portion thereof toward said shank, a holder having a bore receiving said shank for relative axial movement between the drill and holder, a spring in said bore acting between said holder and shank adapted to be energized in response to application of pressure on said holder for moving the latter axially toward the drill and to move said holder in an opposite axial direction relative to said drill in response to relief of said pressure on said holder, a guide movable with said holder and having portions thereof respectively engaged with said flutes for rotating the drill in respective opposite directions in response to axial movements of the holder as aforesaid, and a surface at said other end of the drill adapted to perform the cutting operation and so directed circumferentially with respect to the flutes that the cutting operation is performed only as the drill is rotated in that direction induced by axial movement of the holder in said opposite direction under the influence of said spring as aforesaid.

2. A tool of the class described including a cutter and a holder arranged in telescoping relation and for axial movement of the holder toward and away from the cutter, said cutter having a cutting surface at that terminal portion thereof remote from the holder and so formed and directed as to perform its cutting operation in response to rotation of the cutter in one direction only, and cooperating means respectively movable with the holder and cutter forming a driving connection therebetween and so constructed and arranged as to rotate said cutter in a non-cutting direction during movement of the holder toward the cutter and to rotate said cutter in a cutting direction during movement of the holder away from the cutter, and a spring acting between the cutter and holder urging the latter away from the cutter.

CHARLES H. BENSINGER.